US010077666B2

(12) United States Patent
Suciu et al.

(10) Patent No.: US 10,077,666 B2
(45) Date of Patent: Sep. 18, 2018

(54) METHOD AND ASSEMBLY FOR REDUCING SECONDARY HEAT IN A GAS TURBINE ENGINE

(71) Applicant: United Technologies Corporation, Hartford, CT (US)

(72) Inventors: Gabriel L. Suciu, Glastonbury, CT (US); Brian D. Merry, Andover, CT (US); James D. Hill, Tolland, CT (US); Mark F. Zelesky, Bolton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 335 days.

(21) Appl. No.: 14/844,082

(22) Filed: Sep. 3, 2015

(65) Prior Publication Data

US 2016/0084090 A1     Mar. 24, 2016

Related U.S. Application Data

(60) Provisional application No. 62/053,853, filed on Sep. 23, 2014.

(51) Int. Cl.
| | | |
|---|---|---|
| *F01D 5/18* | (2006.01) | |
| *F01D 5/08* | (2006.01) | |
| *F01D 11/00* | (2006.01) | |
| *F02C 3/08* | (2006.01) | |
| *F01D 5/06* | (2006.01) | |

(52) U.S. Cl.
CPC ............... *F01D 5/18* (2013.01); *F01D 5/06* (2013.01); *F01D 5/185* (2013.01); *F01D 5/186* (2013.01); *F01D 5/187* (2013.01); *F01D 11/001* (2013.01); *F01D 11/003* (2013.01); *F01D 11/005* (2013.01); *F02C 3/08* (2013.01); *F05D 2220/32* (2013.01); *F05D 2260/20* (2013.01); *Y02T 50/676* (2013.01)

(58) Field of Classification Search
CPC . F01D 5/18; F01D 5/185; F01D 5/186; F01D 5/187; F01D 5/06; F01D 11/003; F01D 11/001; F01D 11/005; F05D 2220/32; F05D 2260/20; Y02T 50/676; F02C 3/08
USPC ..................................... 415/115; 416/1, 95
See application file for complete search history.

(56) References Cited

U.S. PATENT DOCUMENTS

| | | | | |
|---|---|---|---|---|
| 4,820,116 A | * | 4/1989 | Hovan | ...................... F01D 1/32 |
| | | | | 415/115 |
| 4,884,950 A | * | 12/1989 | Brodell | ................... F01D 5/081 |
| | | | | 415/173.7 |
| 5,233,824 A | | 8/1993 | Clevenger | |

(Continued)

FOREIGN PATENT DOCUMENTS

| | | |
|---|---|---|
| EP | 0921273 B1 | 12/2003 |
| WO | 2014100316 | 6/2014 |

OTHER PUBLICATIONS

Extended European Search Report for European Application No. 15186522.7, dated Feb. 22, 2016.

*Primary Examiner* — Audrey K Bradley
*Assistant Examiner* — Kelsey Stanek
(74) *Attorney, Agent, or Firm* — Carlson, Gaskey & Olds, P.C.

(57) ABSTRACT

A turbine section includes a rotor assembly which includes an internal cooling passage. A segmented seal is adjacent the rotor assembly and includes a fluid passage that is in fluid communication with the internal cooling passage.

16 Claims, 3 Drawing Sheets

(56) References Cited

U.S. PATENT DOCUMENTS

| | | | |
|---|---|---|---|
| 5,236,302 | A | 8/1993 | Weisgerber et al. |
| 5,320,488 | A | 6/1994 | Meade et al. |
| 5,338,154 | A | 8/1994 | Meade et al. |
| 5,833,244 | A * | 11/1998 | Salt ...................... F01D 11/001 277/418 |
| 6,261,063 | B1 | 7/2001 | Chikami et al. |
| 7,430,802 | B2 | 10/2008 | Tiemann |
| 7,458,774 | B2 | 12/2008 | Albrecht, Jr. et al. |
| 7,520,718 | B2 | 4/2009 | Engle |
| 8,562,285 | B2 * | 10/2013 | McCaffrey .............. F01D 5/081 415/115 |
| 8,740,554 | B2 | 6/2014 | Virkler et al. |
| 2004/0148943 | A1 | 8/2004 | Laurello et al. |
| 2007/0059158 | A1 | 3/2007 | Alvanos et al. |

* cited by examiner

METHOD AND ASSEMBLY FOR REDUCING SECONDARY HEAT IN A GAS TURBINE ENGINE

CROSS-REFERENCE TO RELATED APPLICATIONS

This application claims priority to U.S. Provisional Application No. 62/053,853, which was filed on Sep. 23, 2014 and is incorporated herein by reference.

BACKGROUND

Gas turbine engines with multiple turbine stages include interstage seal arrangements between adjacent stages for improved operating efficiency. The interstage seal arrangements confine the flow of hot combustion core gases within an annular path around and between stationary turbine stator blades, nozzles, and also around and between adjacent rotor blades.

The interstage seal arrangements may also serve to confine and direct cooling air to cool the turbine disks, the turbine blade roots, and also the interior of the rotor blades themselves as rotor blade cooling facilities higher turbine inlet temperatures, which results in higher thermal efficiency of the engine and higher thrust output. The interstage seal configurations must also accommodate axial and radial movements of the turbine stage elements during engine operation as the several elements are subjected to a range of different loadings and different rates of expansion based upon local part temperatures and aircraft operating conditions.

One such interstage seal includes a monolithic interstage seal structure that spans the axial gap between the rotor disks. Although effective, the monolithic interstage seal is typically manufactured from high strength materials to withstand the relatively high hoop stresses induced by rotation. This may result in a relatively heavy seal structure that imposes additional weight adjacent the rotor disks. Another interstage seal is a segmented seal assembly in which multiple segments are assembled together circumferentially. Although effective, the multiple segments may increase transient load variation between the rotor disks and may result in additional leakage paths between the segments.

SUMMARY

In one exemplary embodiment, a turbine section includes a rotor assembly which includes an internal cooling passage. A segmented seal is adjacent the rotor assembly and includes a fluid passage that is in fluid communication with the internal cooling passage.

In a further embodiment of the above, the segmented seal is configured to rotate with the first rotor assembly.

In a further embodiment of any of the above, a cooling air passage is in communication with an inlet to the fluid passage in the segmented seal.

In a further embodiment of any of the above, a vane assembly is adjacent the rotor assembly. The cooling air passage extends through the vane assembly.

In a further embodiment of any of the above, the rotor assembly is down stream of the vane assembly.

In a further embodiment of any of the above, an upstream rotor assembly is includes. The cooling air passage extends through the upstream rotor assembly.

In a further embodiment of any of the above, the internal cooling passage extends through a root portion and an airfoil portion of at least one rotor blade of the rotor assembly.

In a further embodiment of any of the above, the fluid passage in at least one segmented seal includes a vane configured to turn cooling fluid.

In another exemplary embodiment, a gas turbine engine includes a first rotor assembly and a second rotor assembly including an internal cooling passage. A segmented seal is adjacent the second rotor assembly and includes a fluid passage that is in fluid communication with the internal cooling passage.

In a further embodiment of the above, the segmented seal is configured to rotate with the first rotor assembly and the second rotor assembly.

In a further embodiment of any of the above, a cooling air passage is in communication with an inlet to the fluid passage in the segmented seal.

In a further embodiment of any of the above, a vane assembly separates the first rotor assembly from the second rotor assembly and includes a cooling air passage that extends through the vane assembly.

In a further embodiment of any of the above, the internal cooling passage extends through a root portion and an airfoil portion of at least one rotor blade of the second rotor assembly.

In a further embodiment of any of the above, the fluid passage in the segmented seal includes a vane that is configured to turn a cooling fluid from a radial direction to an axial direction.

In another exemplary embodiment, a method of cooling a gas turbine engine includes directing cooling air from a cooling air source through a segmented seal located between a first rotor assembly and a second rotor assembly. The cooling air is directed through the segmented seal to an internal cooling passage in a rotor blade.

In a further embodiment of any of the above, the segmented seal is configured to rotate with the first rotor assembly and the second rotor assembly.

In a further embodiment of any of the above, the cooling air travels through a cooling air passage in a vane assembly.

In a further embodiment of any of the above, the cooling air passage in the vane assembly directs the cooling air tangentially relative to the segmented seal.

DETAILED DESCRIPTION

Figure 1:
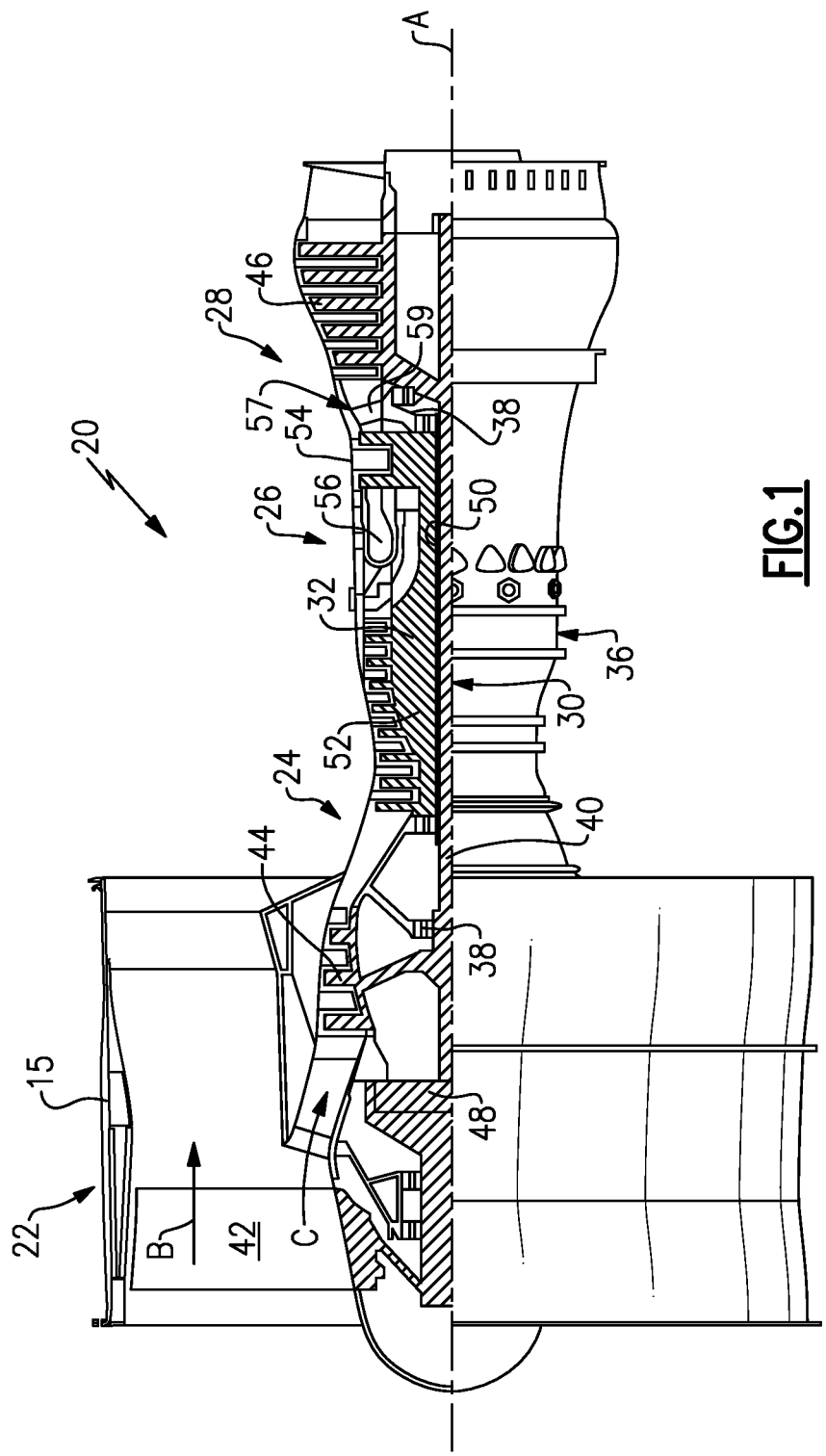
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
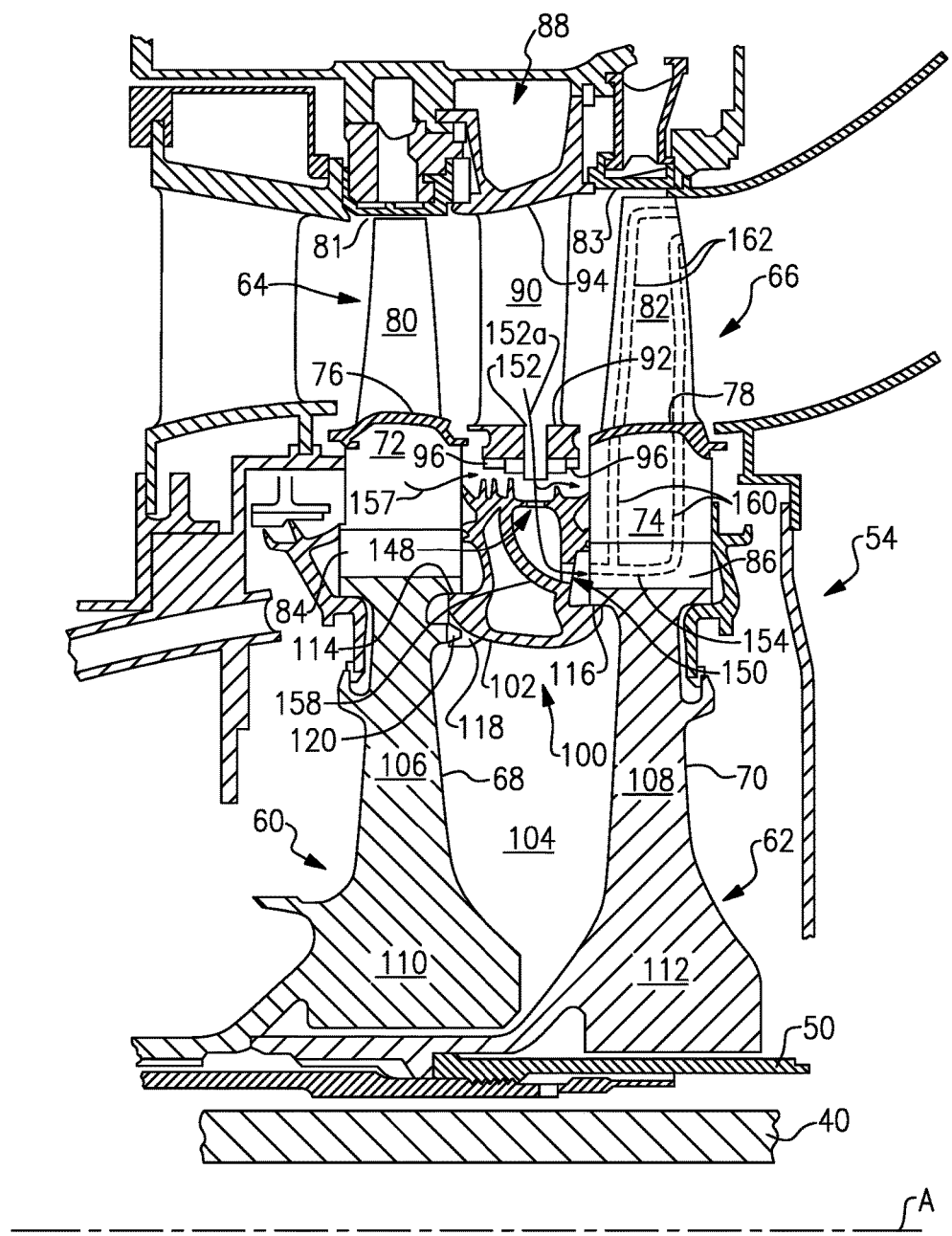
FIG. 2 is an enlarged schematic cross-section of a high pressure turbine section for the gas turbine engine of FIG. 1.

FIG. 2 illustrates an enlarged schematic view of the high pressure turbine 54, however, other sections of the gas turbine engine 20 could benefit from this disclosure. The high pressure turbine 54 includes a two-stage turbine section with a first rotor assembly 60 and a second rotor assembly 62. The first rotor assembly 60 and the second rotor assembly 62 are attached to the outer shaft 50.

The first rotor assembly 60 includes a first array of rotor blades 64 circumferentially spaced around a first disk 68 and the second rotor assembly 62 includes a second array of rotor blades 66 circumferentially spaced around a second disk 70. Each of the first and second array of rotor blades 64, 66 include a respective first root portion 72 and a second root portion 74, a first platform 76 and a second platform 78, and a first airfoil 80 and a second airfoil 82. Each of the first and second root portions 72, 74 is received within a respective first rim and a second rim 84, 86 of the first and second disk 68, 70. The first airfoil 80 and the second airfoil 82 extend radially outward toward a first and second blade outer air seal (BOAS) assembly 81, 83, respectively.

The first and second array of rotor blades 64, 66 are disposed in the core flow path that is pressurized in the compressor section 24 then heated to a working temperature in the combustor section 26. The first and second platforms 76, 78 separate a gas path side inclusive of the first and second airfoils 80, 82 and a non-gas path side inclusive of the first and second root portions 72, 74.

A shroud assembly 88 within the engine case structure 36 between the first rotor assembly 60 and the second rotor assembly 62 directs the hot gas core airflow in the core flow path from the first array of rotor blades 64 to the second array of rotor blades 66. The shroud assembly 88 may at least partially support the first and second blade outer air seals 81, 83 and include an array of vanes 90 that extend between a respective inner vane platform 92 and an outer vane platform 94. The outer vane platform 94 may be supported by the engine case structure 36 and the inner vane platform 92 supports an abradable annular seal 96, such as a honeycomb, to seal the hot gas core airflow in the axial direction with respect to a segmented interstage seal assembly 100.

The segmented interstage seal assembly 100 includes a plurality of individual seal segments 102 (FIG. 3) disposed between the first and second rotor assemblies 60, 62. The segmented interstage seal assembly 100 creates a seal between the axially flowing hot gas core airflow and a radially inner volume 104 between a respective first and second web 106, 108 and a first and second hub 110, 112 of the first and second disk 68, 70.

Each seal segment 102 is radially supported on a respective pilot diameter 114, 116, formed by the respective first and second rim 84, 86 of the first and second disk 68, 70. At least one of the individual seal segments 102 includes an anti-rotation tab 118 that interfaces with a stop 120 on the first rim 84 of the first disk 68. It should be appreciated that various interfaces may be alternatively or additionally provided on one, or multiple, seal segments 102. At least a portion of the seal segment extends continuously between the first rotor assembly 60 and the second rotor assembly 62.

Figure 3:
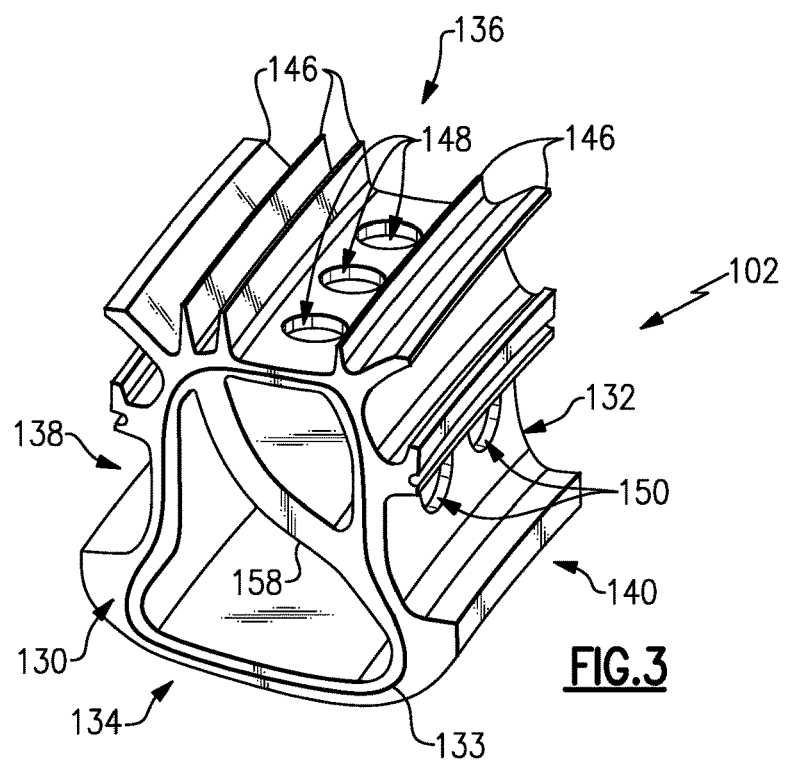
FIG. 3 is a perspective view of an example seal segment.
Figure 4:
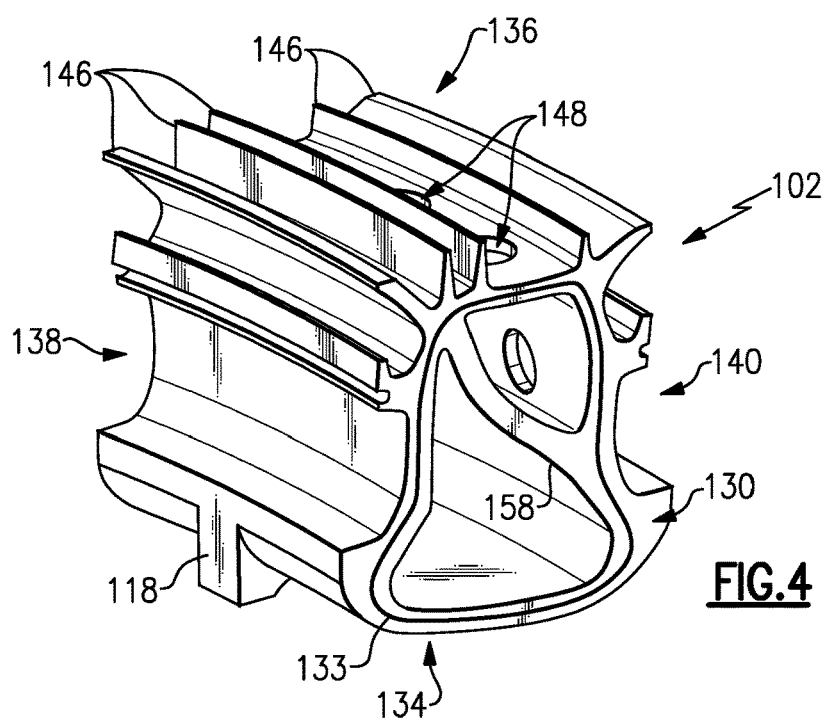
FIG. 4 is another perspective view of the example seal segment of FIG. 3.

As shown in FIGS. 3 and 4, each seal segment 102 generally includes a first circumferential end 130, a second circumferential end 132, a first radial side 134, a second radial side 136, a first axial side 138, and a second axial side 140. A plurality of knife edges 146 extend along the second radial side 136 for mating with the abradable annular seal 96 (FIG. 2) on the inner vane platform 92 to reduce hot gas ingestion between the first and second rotor assemblies 60, 62. A seal 133, such as a feather seal or a rope seal, can be located between the first circumferential end 130 of a first seal segment 102 and the second circumferential end 132 of a second adjacent seal segment 102 to reduce leaks between the adjacent seal segments 102 during transient or off design operating conditions. Although the seal 133 is shown following a perimeter of the first circumferential end 130, the seal 133 could extend along only a portion of the first circumferential end 130 or even be attached to the second circumferential end 132 instead of the first circumferential end 130.

A first plurality of openings 148 extend through the second radial side 136 of the seal segment 102 and a second plurality of openings 150 extend through a second axial side 140 of the seal segment to receive and direct vane cooling air 152*a* from a passage 152 through the vanes 90 into the second disk 70. The vane cooling air 152*a* is directed tangentially at the first plurality of openings 148 to minimize pressure loss entering the segmented seal 102. The second plurality of openings 150 thereby operate essentially as a tangential onboard injector (TOBI). Additionally, cooling air 157 from the first rotor assembly 60 could be directed into the first plurality of openings 148.

As the cooling air passes through the seal segment 102, a turning vane 158 turns the air from moving in a radially inward direction to an axial downstream direction out the second plurality of openings 150.

As the cooling air exits the second plurality of openings 150 in the seal segment 102 from the turning vane 158, the cooling air is directed to root passages 160 extending through the second root portion 74 of the rotor blades 66. In the illustrated embodiment, passages 154 extend through the second rim 86 to fluidly connect the root passages 160 with the second plurality of openings 150. However, the root passages 160 could extend through the second root portion 74 to communicate with the second openings without the passages 154. After the cooling air passes through the root passages 160, the cooling air enters airfoil passages 162 in the second airfoil 82. In the illustrated example, the cooling air exits the second airfoil 82 along a trailing edge of the second airfoil.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine section comprising:
 a rotor assembly including an internal cooling passage; and
 a segmented seal adjacent the rotor assembly including a fluid passage in fluid communication with the internal cooling passage, wherein the fluid passage in the segmented seal includes a turning vane configured to turn cooling fluid and the turning vane extends from a radially outer side of the segmented seal axially forward from a plurality of inlet openings to the fluid passage extending through the radially outer side to an axially aft side of the segmented seal radially inward from a plurality of outlet openings to the fluid passage in the axially aft side, wherein the segmented seal is configured to rotate with the rotor assembly.

2. The turbine section of claim 1, further comprising a cooling air passage in fluid communication and upstream of an inlet to the fluid passage in the segmented seal.

3. The turbine section of claim 2, further comprising a vane assembly adjacent the rotor assembly, wherein the cooling air passage extends through the vane assembly.

4. The turbine section of claim 3, wherein the rotor assembly is down stream of the vane assembly.

5. The turbine section of claim 3, wherein an outlet of the cooling air passage is located at a radially inner edge of the vane assembly.

6. The turbine section of claim 2, further comprising an upstream rotor assembly, wherein the cooling air passage extends through the upstream rotor assembly.

7. The turbine section of claim 1, wherein the internal cooling passage extends through a root portion and an airfoil portion of at least one rotor blade of the rotor assembly.

8. A gas turbine engine comprising:
 a first rotor assembly;
 a second rotor assembly downstream of the first rotor assembly including an internal cooling passage;
 a vane assembly separating the first rotor assembly from the second rotor assembly including a cooling air passage extending through the vane assembly; and
 a segmented seal adjacent the second rotor assembly including a seal fluid passage in fluid communication with and downstream of the cooling air passage in the vane assembly and in fluid communication with the internal cooling passage in the second rotor assembly, wherein the segmented seal is configured to rotate with the first rotor assembly and the second rotor assembly.

9. The gas turbine engine of claim 8, further comprising a cooling air passage in fluid communication and upstream of an inlet to the fluid passage in the segmented seal.

10. The gas turbine engine of claim 8, wherein the internal cooling passage extends through a root portion and an airfoil portion of at least one rotor blade of the second rotor assembly.

11. The gas turbine engine of claim 8, wherein the fluid passage in the segmented seal includes a turning vane configured to turn a cooling fluid from a radial direction to an axial direction.

12. The gas turbine engine of claim 11, wherein the turning vane extends from a radially outer side of the segmented seal axially forward from a plurality of inlet openings extending through the radially outer side to an axially aft side of the segmented seal radially inward from a plurality of outlet openings in the axially aft side.

13. A method of cooling a gas turbine engine comprising:
   directing cooling air from a cooling air source radially inward through a cooling air passage in a vane assembly;
   directing the cooling air through a segmented seal located between a first rotor assembly and a second rotor assembly, wherein the segmented seal is configured to rotate with the first rotor assembly and the second rotor assembly; and
   directing the cooling air through the segmented seal to an internal cooling passage in a rotor blade.

14. The method of claim 13, wherein the cooling air passage in the vane assembly directs the cooling air tangentially relative to the segmented seal.

15. The method of claim 13, further comprising turning the cooling fluid in the segmented seal from a radially inward direction to an axially downstream direction with a turning vane located in the segmented seal.

16. The method of claim 15, wherein the turning vane extends from a radially outer side of the segmented seal axially forward from a plurality of inlet openings extending through the radially outer side to an axially aft side of the segmented seal radially inward from a plurality of outlet openings in the axially aft side.

* * * * *